April 26, 1955     E. R. KEBBON     2,706,962
BIMETALLIC THERMOMETER
Filed Dec. 7, 1951
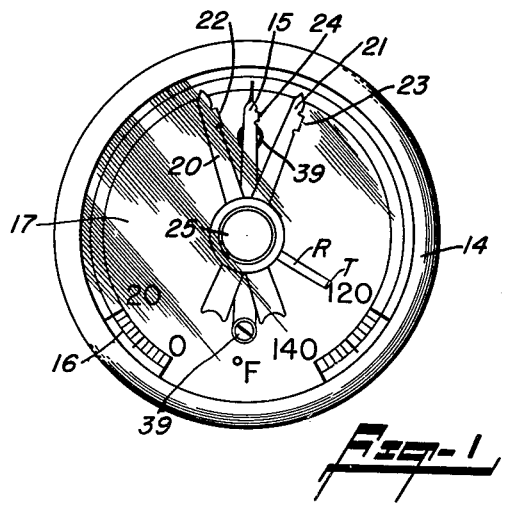
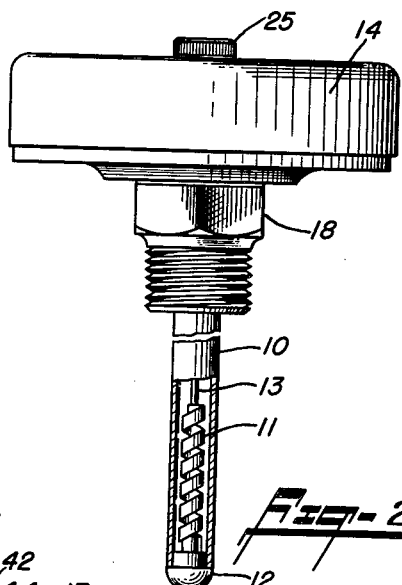
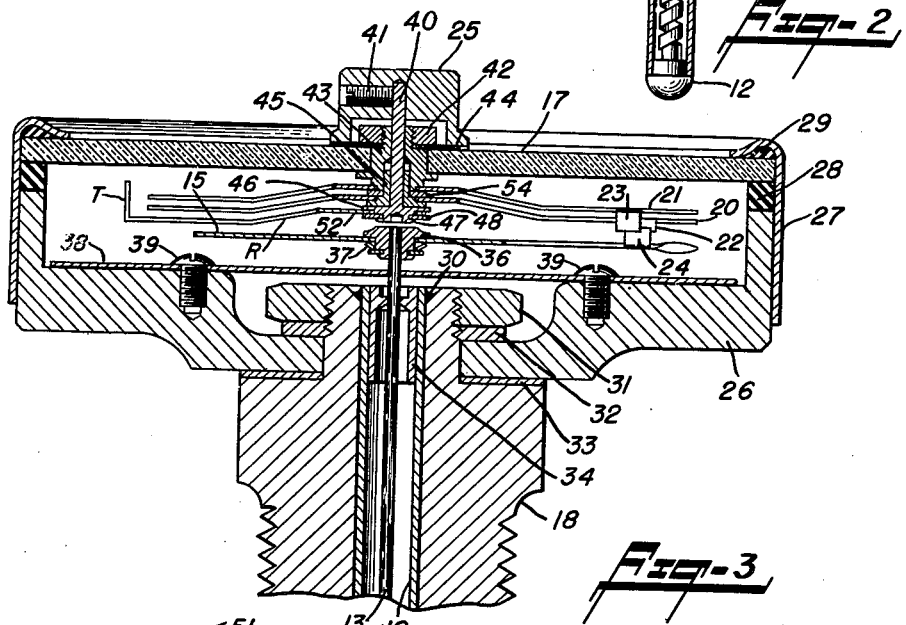
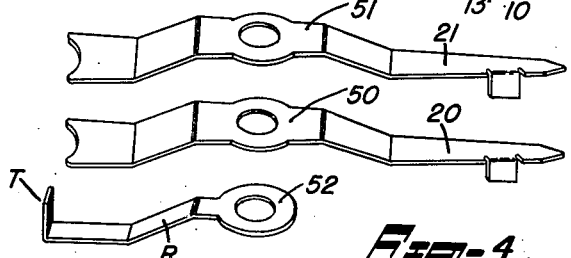
EARL R. KEBBON
INVENTOR.
BY
*Taylor, Cifelli & Junick*
ATTORNEYS

United States Patent Office 2,706,962
Patented Apr. 26, 1955

2,706,962
BIMETALLIC THERMOMETER

Earl R. Kebbon, Chatham, N. J., assignor to Weston Electrical Instrument Corporation, Newark, N. J., a corporation of New Jersey Application December 7, 1951, Serial No. 260,432

3 Claims. (Cl. 116—129)

This invention relates to bimetallic thermometers and more particularly to a precision thermometer including one or more auxiliary pointers for indicating the maximum excursions of the main indicating pointer and a selectively-operable resetting arm for restoring such auxiliary pointers to a desired position relative to the instrument scale.

The bimetallic element of a sensitive thermometer comprises a thin ribbon of bimetal wound in the form of a helical coil of one or more layers. One end of the coil is anchored to a suitable part of the thermometer housing and the other end is attached to a suitable indicating pointer which cooperates with a scale calibrated in temperature values. Temperature changes at the bimetallic coil result in a rotation of the indicating pointer. Even though the mechanical torque generated by the coil, in response to relatively small temperature changes, is of very small magnitude, it is often desirable to provide the instrument with one or more pivotally-mounted, auxiliary pointers affording a fixed indication of the maximum and/or minimum temperature changes. This invention is directed to the provision of such auxiliary maximum and minimum indicators in combination with a resetting arm whereby one or both such indicators may be returned to a desired starting position.

An object of this invention is the provision of a bimetallic thermometer including an auxiliary pointer movable by the main indicating pointer and means for rotating said auxiliary pointer to a selected position.

An object of this invention is the provision of a bimetallic thermometer having a main indicating pointer cooperating with a scale of temperature values, a pair of frictionally-mounted auxiliary pointers adapted for individual rotation relative to the scale in response to rotary movement of the main indicating pointer, and a resetting member operable externally of the instrument case for setting either of the auxiliary pointers to a selected position relative to the scale.

An object of this invention is the provision of a temperature indicating instrument comprising a substantially-sealed housing including a stem, a bimetallic coil disposed within said stem, a staff secured to the coil and extending into the housing, an indicating pointer secured to the said staff and cooperating with a scale, a transparent cover on said housing, a mounting shaft extending through a central hole in the cover, an external knob secured to said shaft, a resetting arm frictionally secured to said shaft and disposed within the housing, a pair of auxiliary pointers frictionally supported by said shaft each auxiliary pointer carrying a downwardly-depending vane lying in the rotational path of travel of the indicating pointer, and silicone grease carried by the frictionally-contacting surfaces between the said shaft and each of the auxiliary pointers and resetting arm.

These and other objects and advantages will become apparent from the following description when taken with the accompanying drawings. It will be understood the drawings are for purposes of description and are not to be construed as defining the scope or limits of the invention, reference being had for the latter purpose to the appended claims.

In the drawings wherein like reference characters denote like parts in the several views:

Figure 1 is a front view of a thermometer made in accordance with this invention;

Figure 2 is a side elevation of the device shown in Figure 1 with part of the stem broken away;

Figure 3 is a fragmentary, central cross-sectional view of the device, drawn to an enlarged scale; and Figure 4 is an isometric view showing the construction of the maximum and minimum pointers and the reset arm.

Referring now to Figures 1 and 2, the thermometer comprises a tubular stem 10 in which the helical, bimetallic coil 11 is mounted. As shown, one end of the coil is secured to a plug 12, as by soldering or welding, said plug being soldered or brazed to the shell to close the end thereof. The other end of the coil is fastened to a staff 13 that extends into the casing 14. Secured to the end of the staff is a main indicating pointer 15 that co-operates with a scale 16 of temperature values visible through the transparent cover 17 of the instrument. When the instrument is designed for industrial use it is provided with a threaded, hexagonal nut 18 that serves as a convenient means for attaching the thermometer to the wall of a vessel, apparatus, etc. The auxiliary pointers 20, 21 are mounted for rotation about an axis corresponding substantially to that of the main pointer 15, each auxiliary pointer having a downwardly-extending vane 22, 23, respectively, attached thereto. Such vanes extend into the path of travel of a similar vane 24 extending upwardly from the indicating pointer 15. If the auxiliary pointers be mounted in such manner that they will remain in any given position while, at the same time, being subject to rotational movement by a small force applied thereto, it will be apparent one or the other of the auxiliary pointers will rotate with the main pointer 15 upon engagement of the cooperating vanes 24 and 22 or 24 and 23. Thus, if the pointer 15 is rotated to the 20 mark on the scale, in response to the action of the bimetallic coil, the auxiliary pointer 20 will likewise be rotated to such scale mark. A subsequent reverse rotation of the pointer 15 will leave the auxiliary pointer at the 20 mark. Consequently, the auxiliary pointer 20 will indicate, at any given time, the minimum temperature to which the bimetallic coil has been subjected. Similarly, the auxiliary pointer 21 will indicate, at any given time, the maximum such temperature. In order to reset the maximum and minimum pointers I provide a knurled knob 25 that is attached to a shaft passing through the transparent cover 17. Frictionally secured to the inner end of such shaft is an arm R having an end T bent upwardly for engagement with the side edge of either auxiliary pointer. It will be noted that the tail end of the auxiliary pointers have radial lengths less than that of the reset arm R whereby the arm may be rotated freely, by means of the knob 25, without the upstanding end T striking the tail of either pointer.

The construction of maximum-minimum indicators and an externally-operated resetting arrangement is subject to certain practical, design limitations. In the first place, the auxiliary maximum and minimum pointers must remain in any fixed position until reset. At the same time each such pointer must respond to rotational movement by the application of a very small force generated by the temperature-sensitive bimetallic coil as it is apparent that any significant restraining force applied to the main indicating pointer, by the auxiliary pointers, will disturb the normal indicating accuracy of the instrument. Variable such restraining forces will further effect the reliability of the indications. Still further, the resetting arm must transmit sufficient force to either or both of the auxiliary pointers for resetting purposes yet must be designed to prevent damage to the main indicating pointer upon excessive rotation of the finger-operable knob.

A simple, efficient arrangement that meets the requirements set forth above is illustrated in the enlarged, cross-sectional view of Figure 3. Here the instrument casing is shown as comprising a base 26, the transparent cover 17 and a clamping ring 27. The clamping ring frictionally engages the outer wall of the base and urges the cover 17 against a resilient washer 28, and the space between the turned-over edge of the ring and the outer surface of the cover is filled with a suitable cement 29, thereby providing a dust-tight enclosure. The tubular stem 10 is soldered to the inner end of the nut 18, as shown by the numeral 30, and the flat nut 31 cooperates with the outer nut 18 to clamp the stem to the base 26, suitable washers 32, 33 being provided to retain the parts in fixed position. The staff 13 passes through a bushing 34 having a tapered inner section that serves as a bearing to limit lateral movement of the staff to which the main indicating pointer 15 is attached as by the bushing 36 and spring washer 37. As shown, the pointer 15 is spaced from the scale plate 38 that is secured to the base 26 by the screws 39, and the pointer carries an upwardly-extending member or vane 24. The auxiliary pointer and resetting arm assembly comprises a shaft 40 to which the external knob 25 is secured by a set screw 41. A central bore in the knob accommodates the flat nut 42 which is threaded on the bushing 43 extending through a central hole in the transparent cover 17. It will be noted that the bushing 43 has a base of enlarged diameter which seats against the inner surface of the cover whereby the opening in the cover is sealed effectively, when the nut 42 is in place over the flat washer 44. It may here be pointed out that the bushing 43 and the nut 42 remain in fixed position relative to the cover. The shaft 40 passes through an axial hole in the bushing 43 said hole terminating in an enlarged-diameter bore to accommodate the shank of the hollow bushing 45. The shaft 40 includes an integral, circular flange 46 terminating in a reduced-diameter section 47 that passes through a central hole in the flat washer 48. Each of the auxiliary pointers 20, 21 and the reset arm R are provided with circular hubs having central holes therein, as shown in Figure 4, the respective hubs being identified by the numerals 50, 51, 52.

The hub section of the auxiliary pointers and reset arm are flat and the hole in each has a diameter slightly larger than the diameter of the bushing element that is inserted therethrough in the assembly of the mechanism. Thus, as shown in Figure 3, the hub 52 of the reset arm R, is positioned between the circular flange 46 (of the shaft 40) and the flat washer 48 when the end 47 of the shaft is peaned over, as shown. It will be noted that the hub 52, of the reset arm, is disposed over a circular shoulder extending from the flange 46. The axial height of such shoulder is slightly greater than the thickness of the reset hub from which it will be apparent that the reset arm is free to rotate relative to the shaft 40. The surfaces of the hub 52 and the contacting surfaces of the washer 48 and of the flange 46 are coated with a thin film of suitable grease thereby providing a frictional assembly whereby the reset arm R will rotate, upon rotation of the shaft 40. When the upwardly-extending end T, of the reset arm, strikes the forward end of one or both of the auxiliary pointers 20, 21 these pointers will rotate therewith. However, when the reset arm is even gently restrained against rotational movement, continued rotation of the shaft merely results in slippage between the reset arm hub and the cooperating friction surfaces. I have found that the very thin film of silicone grease applied to relatively large area, flat contacting surfaces permits of a relatively loose assembly between the reset arm and the friction surfaces provided by the washer 48 and the flange 46 of the shaft. When the knob 25 is rotated slowly, the silicone grease provides frictional engagement between the shaft and the reset arm to impart rotary movement to the auxiliary pointers. A sudden rotation of the knob at the moment of contact between the reset arm and the auxiliary pointer results in slippage with little or no motion imparted to the pointer.

The upper auxiliary pointer 21 is disposed over the bushing 43 and is held in position by the flat washer 54. The lower auxiliary pointer 20 is disposed over the bushing 45 and the pointer hub abuts against the flat washer 54 when the bushing 45 is force-fitted into the enlarged bore of the bushing 43. It will be noted that the hub section of each auxiliary pointer is fitted over a reduced diameter boss, or shoulder, on the cooperating bushing. The axial length of each boss is slightly greater than the thickness of the associated hub section so that there is no mechanical clamping of the pointer hubs by the cooperating surfaces of the bushings or the flat washer. All such cooperating surfaces are coated with a thin film of silicone grease. Thus, when the vane 24, carried by the main indicating pointer 15, engages the auxiliary pointer vane 23 or 22, the auxiliary pointer will rotate with no appreciable load added to the relatively-slow, motional response of the temperature-sensitive bimetallic coil. However, the frictional restraint provided by the grease is sufficient to retain the auxiliary pointers in any given position relative the instrument scale regardless of the angular disposition of the instrument as a whole. It will be noted that the effective surface area of the grease film associated with the relatively movable surfaces of the reset arm is greater than that associated with either of the auxiliary pointers. Such larger, surface area of the grease film provides the reset mechanism with sufficient friction to rotate the maximum and/or minimum pointers against the latter's own friction. Although I prefer to coat the relatively slidable surfaces with a silicone grease, a silicone oil is satisfactory for the purpose when the thermometer is not subjected to vibrations. Also, grease other than silicone may be used on thermometers that are not subjected to wide temperature variations.

While I have illustrated my novel construction and assembly of maximum and minimum indicators and a selectively-operable reset as applied to a relatively large industrial bimetallic thermometer, I have successfully applied such construction to a pocket type bimetallic themometer having a one inch dial and a scale range of —40/160 degrees Fahrenheit. I am aware of prior grease type frictional mechanisms but such prior arrangements include a relatively large disc rotatable within a relatively large mass of grease retained within a cup-like reservoir. While such arrangements are suitable for use with devices generating a relatively large driving torque they are not adapted for use in a sensitive thermometer wherein the bimetallic coil generates only a feeble rotational torque.

Those skilled in this art will understand that the vanes carried by the main and auxiliary pointers constitute a preferred form of the invention. Such vanes may be omitted and proper operation obtained by bending the tip of the main pointer upward to extend into the plane of the upper auxiliary pointer 21.

Having new described my invention what I desire to protect by United States Letters Patent is set forth in the following claims.

I claim:
1. A maximum and minimum indicator and reset mechanism for a bimetallic thermometer of the type comprising a rotatable main pointer visible through a transparent cover closing the thermometer housing, said mechanism comprising a hollow bushing extending through a central opening in the cover, said bushing being secured in fixed position relative to the cover; a shaft extending through the bushing and including an enlarged-diameter flange disposed within the housing and spaced from the inner end of the said bushing; a pair of auxiliary pointers rotatably carried by the shaft, said pointers adapted to be engaged by the main pointer and rotated about the shaft; a reset arm having one end offset to engage each of the auxiliary pointers and the other end pivotally secured to the said flange portion of the shaft; a thin film of silicone grease between the co-acting surfaces of the reset arm and flange portion; and a finger-operable knob external of the cover and secured to the said shaft.

2. A maximum and minimum indicator and reset mechanism for a bimetallic thermometer of the type comprising a rotatable main pointer visible through a transparent cover closing the thermometer housing, said mechanism comprising a first hollow bushing having a head abutting the inner surface of the cover and a shank passing through a central hole in the cover; means securing the said bushing in fixed position relative to the cover; a first indicator having a flat hub including a hole, one surface of said hub abutting the head of the said first bushing; a flat washer abutting the other surface of said hub; a second indicator having a flat hub including a hole, one surface of said hub abutting the said flat washer; a second hollow bushing having a head abutting the other surface of the hub of the second indicator and a shank force-fitted into the said first hollow bushing, said second bushing securing the two indicators and flat washer in loose assembled relation such that either indicator is freely rotatable; a thin film of silicone grease on the hub of each indicator and serving as a frictional coupling tending to prevent rotation of the indicators; a shaft extending through the first and second hollow bushings, said shaft having an enlarged head abutting the head of the second hollow bushing; a finger-operable knob secured to the outer end of the shaft; a reset arm having one end offset to engage each of the indicators and a hole in the other end, the latter end abutting the head of said shaft; a second flat washer disposed over the said end of the reset arm; means loosely securing the second washer to the shaft; a thin film of silicone grease on the surfaces of the said other end of the reset arm and tending to prevent rotation of the reset arm relative to the shaft; and means carried by the main pointer for individually engaging the indicators to impart rotation thereto.

3. In a bimetallic thermometer of the type comprising a temperature-sensitive coil actuating a main pointer over a scale, an auxiliary pointer adapted for rotation by the main pointer and a reset arm carried by a rotatable shaft that extends externally of the thermometer housing, said reset arm being adapted upon rotation to engage the said auxiliary pointer; the improvement wherein the said shaft and reset arm include flat contiguous surfaces with a thin film of silicone grease between the said contiguous surfaces.

References Cited in the file of this patent

UNITED STATES PATENTS

| | | |
|---|---|---|
| 1,018,582 | Nelson | Feb. 27, 1912 |
| 2,457,286 | Tollefsen et al. | Dec. 28, 1948 |
| 2,518,928 | Paine et al. | Aug. 15, 1950 |
| 2,558,743 | Ford | July 3, 1951 |
| 2,577,492 | Teter | Dec. 4, 1951 |

FOREIGN PATENTS

| | | |
|---|---|---|
| 172,118 | Switzerland | Sept. 30, 1934 |
| 332,237 | Great Britain | July 10, 1939 |
| 993,338 | France | July 25, 1951 |